Jan. 9, 1968
T. J. O'CONNER
3,363,083
QUICK-CHANGE ELECTRODE SYSTEM FOR
SPARK-CUTTING-APPARATUS
Filed Oct. 24, 1965
6 Sheets-Sheet 1
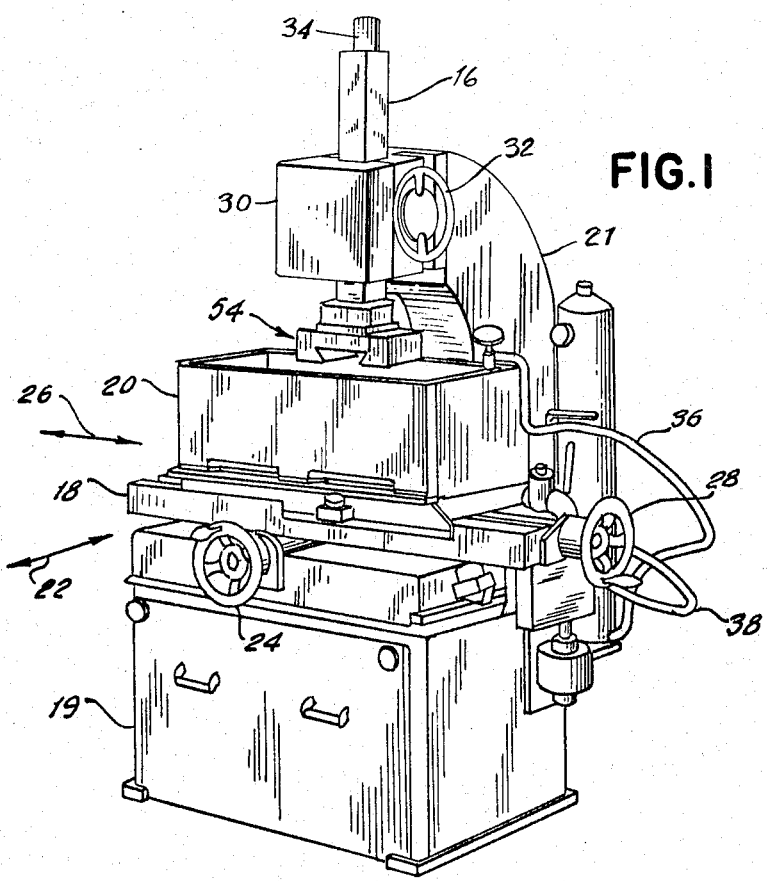
FIG.1
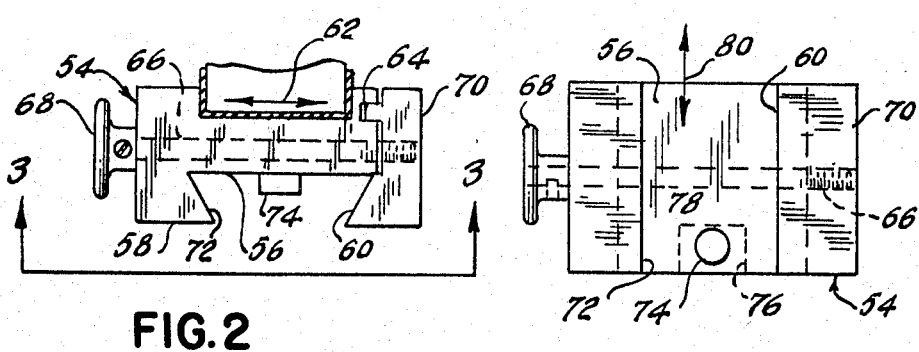
FIG.2
FIG.3
INVENTOR.
THOMAS J. O'CONNOR
BY Whittemore,
Hulbert & Belknap
ATTORNEYS.

Jan. 9, 1968     T. J. O'CONNER     3,363,083
QUICK-CHANGE ELECTRODE SYSTEM FOR
SPARK-CUTTING-APPARATUS

Filed Oct. 24, 1965     6 Sheets-Sheet 2

INVENTOR.
THOMAS J. O'CONNOR
BY Whittemore,
Hulbert & Belknap
ATTORNEYS

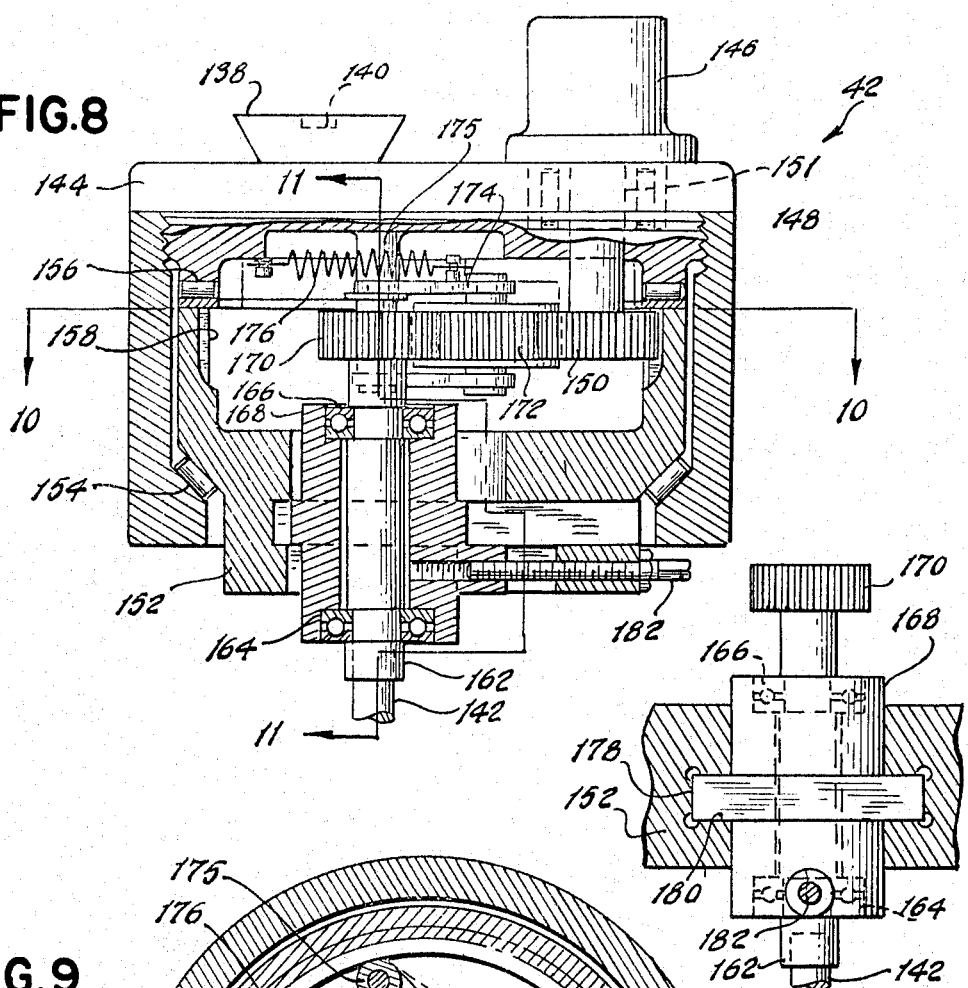
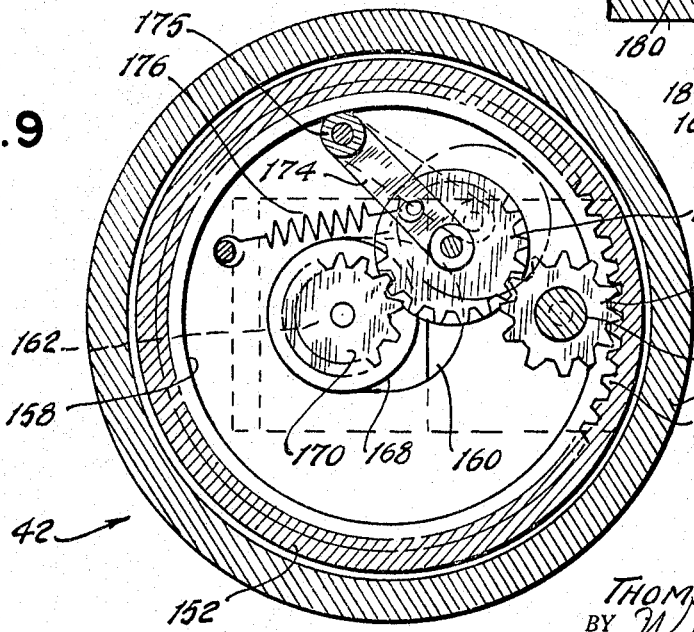
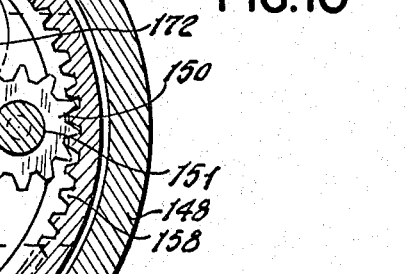

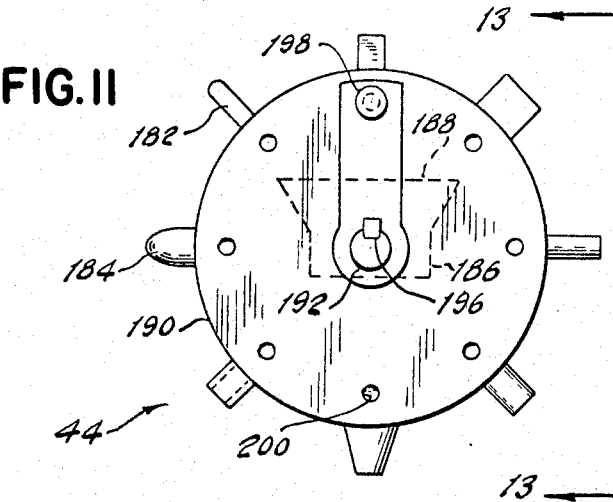
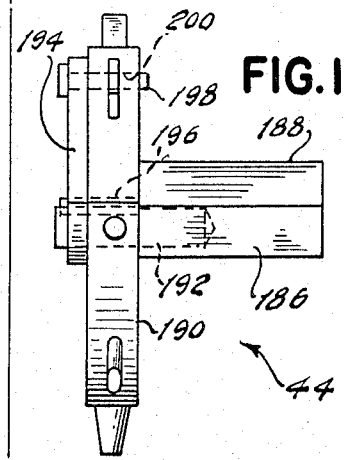
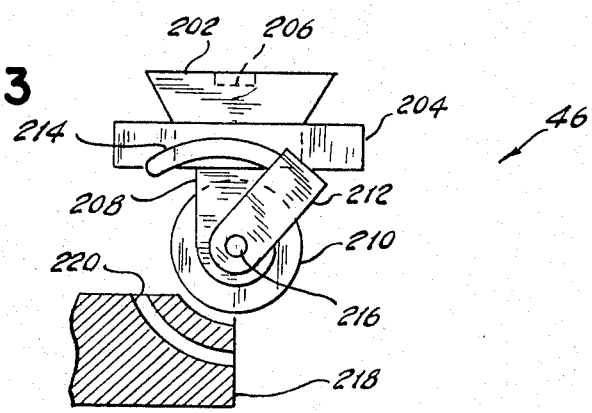
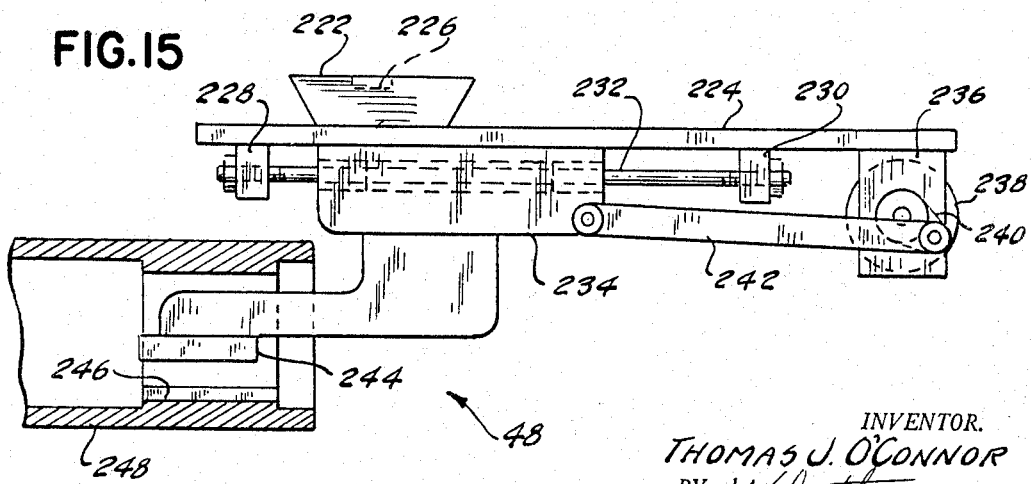

Jan. 9, 1968

T. J. O'CONNER 3,363,083

QUICK-CHANGE ELECTRODE SYSTEM FOR
SPARK-CUTTING-APPARATUS

Filed Oct. 24, 1965

INVENTOR.
THOMAS J. O'CONNOR
BY Whittemore,
Hulbert & Belknap
ATTORNEYS.

United States Patent Office 3,363,083
Patented Jan. 9, 1968

3,363,083
QUICK-CHANGE ELECTRODE SYSTEM FOR SPARK-CUTTING-APPARATUS
Thomas J. O'Connor, 100 Morgan Road,
Ann Arbor, Mich. 48104
Filed Oct. 24, 1965, Ser. No. 504,971
6 Claims. (Cl. 219—69)

ABSTRACT OF THE DISCLOSURE

Structure for effecting the fast, accurate changing of electrodes on machines for electro-erosion of metals, comprising a tool supporting head, means for electrically insulating the tool supporting head from the rest of the machine, a dovetail slot in the tool supporting head having one side movable toward the other side of the slot, means for moving the one side of the dovetail slot toward the other side thereof and a locating pin extending into the dovetail slot adjacent one end thereof. The tool supporting head is carried by a vertically movable guide constructed to provide maximum support for the head with a minimum of wear, and which is quickly and easily adjustable to take up wear between its parts and to align the head. A plurality of separately usable electrode units are mounted on bases receivable in the slot of the head. These units provide: electrodes movable in circular paths about the electrode axis, or in arcuate paths; a rotatable disc carrying several electrodes indexable thereby into use positions; a rectilinearly reciprocable electrode; a deep-hole-machining electrode; and a unit for eroding helical bores. There is also disclosed a workpiece supporting tool for dressing an electrode without removing the electrode from the machine or the workpiece from the tool.

---

This application is a continuation-in-part of my copending application Ser. No. 250,321, filed Jan. 9, 1963, now Patent No. 3,222,494, issued Dec. 7, 1965.

The invention relates to electro-erosion machining of metals and refers more specifically to apparatus for electro-erosion machining including an electro-erosion machine having a mechanical section with an improved guide means for the electrode supporting head thereof which is particularly accurate over an extended period of use and is easily adjustable and means for positively relocating a plurality of interchangeable electrode carrying tools rapidly and accurately on the head and a plurality of interchangeable electrode carrying tools for use with the electro-erosion machine.

Machines for the electro-erosion of metals of the type with which the invention is concerned wherein an electrode and a workpiece immersed in a flowing dielectric fluid are oppositely charged and brought into proximity with each other to cause a spark therebetween which spark has the function of removing material from the workpiece are well known. In this regard reference is made to the British publication "The Electro-Erosion Machining of Metals" by A. L. Livshits, published by Butterworth and Company, publishers, London, England, 1960.

With the electrical discharge machines of the past contact between the electrode supporting head and guide means has usually been reduced to a minimum as by the point contact of ball bearings to provide ease of operation. Wear and consequent misalignment of the head has thus been troublesome in prior apparatus in which complicated or no adjustment means has been provided to realign the head and guide means or take up slack therebetween due to wear.

In addition in the electro-erosion machining of metals it is often desired to change electrodes during the machining of a single workpiece. In the past this changing of electrodes has been time consuming and difficult due to the necessity of exact location of the exchanged electrodes on the supporting head. Further electro-erosion machines have been limited in the past to vertical cutting of workpieces to a depth determined by the movement of the electrode supporting head.

It is therefore one of the objects of the present invention to provide an improved machine for the electro erosion of metals including means for rapidly and accurately locating a plurality of interchangeable electrode carrying tools on the electrode supporting head thereof.

Another object is to provide an improved machine for the electro-erosion of metals including guide structure for the electrode supporting head thereof which is constructed to provide maximum support for the head with a minimum of wear and which is quickly and easily adjustable to take up wear between the guide structure and head and to align the head.

Another object is to provide an improved machine for the electro-erosion of metal including an electrode supporting head having front, back and side surfaces and diagonal transitional surfaces extending between the back and side surfaces and guide structure comprising a plurality of rollers spaced apart longitudinally of the guide structure and in engagement with the transitional surfaces and the front surfaces of the head and means for adjusting the pressure applied to the head by the rollers.

Another object is to provide a machine for the electro-erosion of metals as set forth above wherein the electrode supporting head is provided with a tool receiving dovetail recess therein one side of which is adjustable to permit ready interchanging of electrode carrying tools supported by the head.

Another object is to provide a machine for the electro-erosion of metals as set forth above wherein a locating pin is provided within the dovetail recess cooperable with a locating surface on interchangeable tools to exactly locate the tools on the head.

Another object is to provide a tool for use with an electro-erosion machine as set forth above including a continuously moving wire electrode for cutting slots of accurate width.

Another object is to provide a tool for use with an electro-erosion machine as set forth above including means for supporting and moving an electrode so that an accurately sized opening can be cut in a workpiece with an electrode of substantially smaller dimension than the opening.

Another object is to provide a tool for use with an electro-erosion machine as set forth above including means for indexing into a cutting position with respect to a workpiece a plurality of individual electrodes carried thereby without removing the tool from the head of the machine.

Another object is to provide a tool for use with an electro-erosion machine as set forth above whereby an arcuate passage may be cut in a workpiece.

Another object is to provide a tool for use with an electro-erosion machine as set forth above including means for supporting and reciprocating an electrode.

Another object is to provide a tool for use with an electro-erosion machine as set forth above comprising means for holding a workpiece to be machined and for dressing the electrode of the machine without removing the electrode from the machine or the workpiece from the tool.

Another object is to provide a tool for use with an electro-erosion machine as set forth above including means for supporting an electrode substantially longer than the electrode feed provided by the electrode supporting head of the machine, means for rotating the electrode and for feeding the electrode toward a workpiece in increments, each increment being substantially equal to the allowed head movement of the machine and means for directing a coolant through the electrode.

Another object is to provide a tool for use with an electro-erosion machine as set forth above including means for supporting and rotating an electrode and selectively simultaneously advancing the electrode.

Another object is to provide an improved machine for the electro-erosion of metals and a plurality of tools for use in combination therewith which are simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a perspective view of a machine for the electro-erosion of metals constructed in accordance with the invention.

FIGURE 2 is an enlarged diagrammatic representation of a portion of the head of the machine illustrated in FIGURE 1 showing the dovetail tool receiving recess having an adjustable side and including a locating pin therein.

FIGURE 3 is an end view of the electrode supporting head of the machine illustrated in FIGURE 1 taken in the direction of arrows 3—3 in FIGURE 2.

FIGURE 8 is a diagrammatic view partly in section of a tool for use with the machine illustrated in FIGURE 1 supporting an electrode for revolution in a selected circular path and rotation about its axis.

FIGURE 9 is a section of the tool illustrated in FIGure 8 taken substantially on the line 9—9 in FIGURE 8.

FIGURE 10 is a partial section view of the tool illustrated in FIGURE 8 taken substantially on the line 10—10 in FIGURE 8.

FIGURE 11 is a view of a tool for use with the machine illustrated in FIGURE 1 whereby a plurality of tools may be indexed into a work cutting position without removing the tool from the machine.

FIGURE 12 is an elevation view of the tool illustrated in FIGURE 11 taken in the direction 12 in FIGURE 11.

FIGURE 13 is a diagrammatic representation of a tool for use with the machine illustrated in FIGURE 1 whereby an arcuate passage may be machined in a workpiece.

FIGURE 15 is a diagrammatic representation of a tool for use with the machine illustrated in FIGURE 1 including means for reciprocating an electrode carried thereby.

Figure 7:
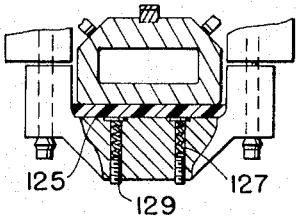
FIGURE 7 is a partly broken away top view similar to FIGURE 6 showing modified guide structure.

With particular reference to the figures of the drawings one embodiment of the present invention will now be disclosed in detail.

A machine 17 for electro-erosion of metals constructed in accordance with the invention is illustrated in FIGURE 1. The machine 17 includes the base 19 to which the frame 21 for supporting the vertically movable electrode supporting head 16 is secured. Machine base 19 also supports the machine table 18 which in turn supports the reservoir 20. The table 18 is movable in a forward and backward direction as indicated by the arrows 22 by convenient means, such as a feed screw (not shown) on operation of the hand wheel 24. The dielectric reservoir 20 is movable transversely of the base 19 in the direction indicated by arrows 26 on operation of the hand wheel 28. The electrode supporting head 16 may be moved vertically in the guide 30 connected to frame 21 either manually by a rack and pinion arrangement 31 connected to the handle 32 or alternatively may be moved automatically by an electronic servo-mechanism in conjunction with a hydraulic cylinder 34.

In operation a workpiece (not shown) is placed in the reservoir 20 beneath an electrode carrying tool supported on the electrode supporting head 16. A fluid dielectric is passed through the reservoir 20 through dielectric lines 36 and 38 which covers the workpiece and contacting portion of the electrode. An electrical potential is provided between the workpiece and electrode and the electrode is moved toward the workpiece until a material eroding spark passes between the electrode and workpiece. A predetermined gap is maintained between the electrode and workpiece by moving the electrode supporting head toward the workpiece as the material is eroded from the workpiece.

The general structure and operation of machines such as 17 for the electro-erosion of metals are well known as set forth above. The construction and operation of machine 17 will therefore not be considered in detail except as to those portions with which the invention is particularly concerned.

In accordance with the invention the electrode supporting head is mounted in and guided by the guide structure 30 which is provided with structure for rapid accurate adjustment and alignment of the head in the guide structure. Further in accordance with the invention structure 54 is provided by which a plurality of tools 40, 42, 44, 46, 48, 50, 52 and 53 may be quickly and efficiently secured to the head 16 with the electrodes carried thereby in exact predetermined positions.

The guide structure 30 includes a base 84 which may be secured to the frame 21 by convenient means, such as bolts (not shown). The base 84 has an opening 85 extending therethrough and a recess 86 in one side thereof having the separate pockets 87 and 88 therein, as shown best in FIGURE 6. A shaft 89 is mounted for rotation in the opening 85. The handle 32 is connected to one end of the shaft 89 for manual rotation thereof while the pinion 83 is secured to the shaft in the pocket 87 and engages the rack 90 which is connected for movement with the head 16.

Figure 6:
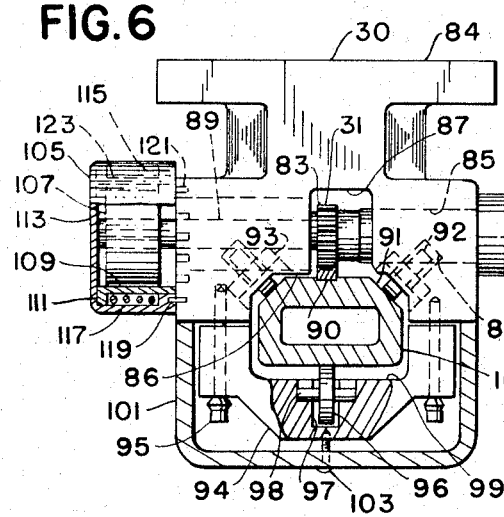
FIGURE 6 is an enlarged, partially broken away top view of the electrode supporting head and guide structure therefor of the machine illustrated in FIGURE 1.

The head 16 is shaped as shown in cross section in FIGURE 6 to provide the longitudinally extending flat surfaces 91 opposite the pockets 88 in the base 84. Rollers 92 are mounted on shafts 93 in pockets 88 and engage the surfaces 91. Yoke members 94 extend over the front of the recess 86 and are adjustable relative to the base 84 by the bolts 95. A roller 96 is positioned in the pocket 97 on the shaft 98 in each yoke 94 and is in engagement with the head 16 within the recess 99 in the yokes 94 again as shown in FIGURE 6. A cover 101 is secured to the yokes 94 by convenient means, such as the screws 103. Thus, the head 16 is mounted for movement through the guide structure 30 in contact with the rollers 92 and 96 at three points which form a triangle support for the head on rotation of the pinion 83.

The weight of the head 16 is counterbalanced by the adjustable spring structure 105 including the coil spring 107, the inner end of which is secured to the shaft 89 and the outer end of which is secured to a rod 123 carried by a cup-shaped member 113 having the radially inwardly extending flange 115. A sleeve 109 having the radially outwardly extending flange 111 is secured to the base 84 between the spring 107 and cup-shaped member 113. The spring 117 is positioned between the flanges 111 and 115 and urges the pin 119 into one of the plurality of angularly spaced apart openings 121 in base 84.

Thus in operation a counterbalancing force on the shaft 89 is determined by the spring 107 which may be adjusted by pulling the cup-shaped member 113 outwardly away from the base 84 to disengage the pin 119 from the openings 121 and rotating the cup-shaped member 113 to which the pin 123 is secured to wind or unwind the spring 107. The cup-shaped member is then released so that the spring 117 urges the pin 119 back into one of the openings 121 to fix the spring tension.

The head 16 may then be driven up or down under the proper spring counterbalancing guided by the rollers 96. Should the head 16 or rollers 96 or 92 wear or otherwise become out of line, ready adjustment of the head relative to the base may be accomplished by means of the bolts 95 which adjust the yokes 94 and their associated rollers 96.

Figure 5:
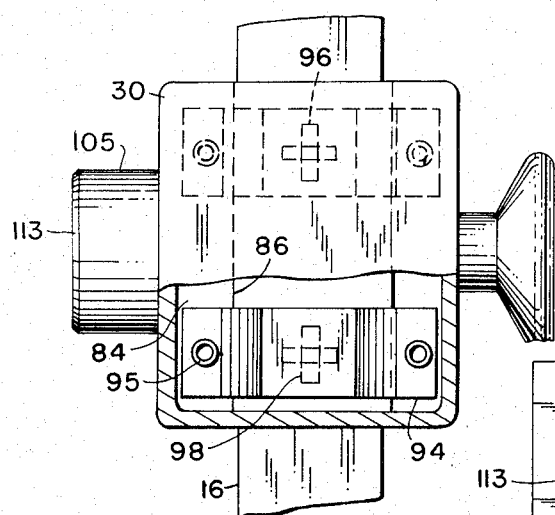
FIGURE 5 is an enlarged, partially browen away front view of the electrode supporting head and guide structure therefor of the machine illustrated in FIGURE 1.
Figure 4:
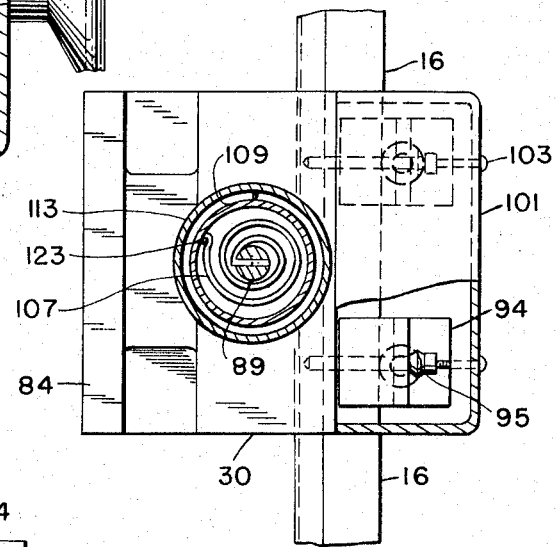
FIGURE 4 is an enlarged, partly broken away side view of the electrode supporting head and guide structure therefor of the machine illustrated in FIGURE 1.

The modified guide structure illustrated in FIGURE 7 is similar in all respects to that illustrated in FIGURES 4-6 except the rollers 96 and pocket 97 of yokes 94 have been replaced by a Teflon plate 125 which may be adjusted to apply variable pressure to the head 16 by the springs 127 and set screws 129.

The structure 54 for permitting interchanging of tools and for locating the tools in exact positions is illustrated best in FIGURES 2 and 3. Thus the vertically movable head 16 is provided with a dovetail recess 56 in the end 58 thereof. Portion 70 of the dovetail recess 56 is detached from the head 16 and is supported for movement in the directions of arrows 62 in FIGURE 2 by means of the tongue and groove construction 64 and the threaded bolt 66 including the adjusting head 68 extending through the end 58 of the head 16 and threadedly engaging the portion 70 of the end 58 of the head 16. With the movement of portion 70 of end 58 of head 16 the side 60 of the dovetail recess 56 is moved to vary the width of the recess 56 as will be obvious from FIGURE 2.

Thus in operation a tool having a dovetail portion thereon proportioned to fit within the recess 56 may be readily secured to the head 16 by merely loosening the bolt 66 to permit a transverse movement of the portion 70 of the head 16 for inserting the dovetail portion in the recess 56 and subsequently tightening the bolt. Exact positioning of the tool with respect to the direction of arrows 62 in FIGURE 2 is accomplished by means of the exact location of surface 72 of the recess 56 on the head 16. In other words, regardless of the distance moved by the portion 70 of the head 16, when the tool is located tightly against the surface 72 with the bolt 66 tightened an electrode carried by the tool positioned in the recess 56 will be exactly located in the direction of arrows 62.

To complete the exact location of an electrode carried by a tool supported on the head 16 the head 16 is further provided with a locating pin 74 within the recess 56. Thus with the dovetail portion of a tool provided with a recess 76, shown in phantom in FIGURE 3, having an exactly located surface 78 when the dovetail portion of the tool is placed in the dovetail recess 56 with the surface 78 in contact with the pin 74 an electrode supported by the tool will be exactly positioned in the direction of arrows 80, as shown in FIGURE 3.

Thus, it will be seen that in accordance with the invention the dovetail recess in the end 58 of head 16 including the transversely adjustable portion 70 of the head 16 will permit easy, simple and efficient means for securing an electrode carrying tool to the head 16 with the electrode positioned in an exact location on the head as determined by the position of the surface 72 and the locating pin 74. The construction 54 illustrated in FIGURES 2 and 3 provides exact location in two dimensions of an electrode carrying tool and facilitates the interchanging of tools with a minimum of readjustment and alignment.

Tool 42 illustrated in FIGURES 8, 9 and 10 includes a dovetail portion 138 having a locating recess 140 therein whereby the tool 42 may be supported by the head 16 with an electrode 142 carried thereby in an exact location on interchanging of tools. Tool 42 is especially constructed for supporting an electrode 142 having a diameter smaller than a diameter to be cut in a workpiece and moving the electrode 142 in a manner to cut the larger diameter in the workpiece.

Tool 42 includes the base 144 having the dovetail portion 138 and to which the motor 146 and the outer cylindrical housing 148 are secured. A drive gear 150 is provided on the output shaft 152 of motor 146. An inner cylindrical housing 152 is rotatably supported between the housing 148 and base 144 on bearings 154 and 156. Housing 152 is provided with internal gear teeth 158 extending completely around the inner surface thereof and in mesh with the drive gear 150. Thus on rotation of the drive gear 150 the inner housing 152 is caused to rotate whereby the electrode 142 is moved in a circle having a center line 160 as shown best in FIGURE 9, whereby a diameter larger than the diameter of the electrode 142 may be cut from a workpiece.

Since with such movement of the electrode 142 the electrode would be worn unevenly by the electrical erosion thereof it is desirable to also rotate the electrode 142 during the erosion process so that the electrode may be worn evenly. Thus the electrode 142 is secured in a shaft 162 journaled for rotation in bearings 164 and 166 carried by slide 168 which is movable radially in housing 152.

A drive gear 170 for the shaft 162 is carried on the upper end thereof as shown in FIGURE 9. Drive gear 170 and drive gear 150 are further interconnected by the gear 172 which is rotatably supported on lever 174. Lever 174 is pivotally secured to the base 144 by pivot pin 175 and is urged in a clockwise direction, as shown in FIGURE 10, by spring 176 whereby gear 172 is maintained in mesh with both drive gear 150 and drive gear 170 even though drive gear 170 is moved in a circular path due to the rotation of the housing member 152.

In accordance with the construction illustrated in FIGURES 8, 9 and 10 the diameter which the electrode 142 is capable of cutting may be varied on radial movement of the slide 168 in the housing 152. Slide 168 is movable radially of the housing 152 by the structure shown best in FIGURE 10. Thus the slide 168 is provided with the horizontally extending guide portions 178 movable along the guide recesses 180 in the housing 152. Slide 168 may be accurately positioned radially of the housing 152 by means of the adjusting screw 182 threadedly engaged with the slide 168 and fixed in position with respect to the housing 152.

Again the electrical connections to the tool of FIGURES 8–10 are provided in the usual manner whereby the dovetail portion 138 of the base is connected to the negative terminal of the machine 17 through the structure 54 and the workpiece is connected to the positive terminal of the power supply of the machine 17.

The tool 44 illustrated in FIGURES 11 and 12 is constructed to permit indexing of different electrodes, such as 182 and 184 into position for cutting a workpiece with the tool 44 in position on the head 16. Thus the tool 44 comprises the base 186 including the dovetail portion 188 adapted to fit within the dovetail recess 56 in the head 16 and the disc 190 mounted for rotation on the pin 192 having a pluralityy of electrodes, such as 182 and 184 positioned around the circumference thereof. Tool 44 further includes the lever 194 rigidly secured to the pin 192 by convenient means, such as key 196. The lever 194 is secured to the disc 190 with the disc 190 indexed into variable positions by means of the removable index pin 198 and the openings 200 positioned around the circumference of the disc 190 opposite each of the electrodes.

Thus in operation assuming it is desired to cut a workpiece with electrodes having a plurality of different cross sections the electrodes are first secured to the disc 190. The tool 44 having the plurality of electrodes thereon is then secured to the head 16 with one of the electrodes in a cutting position relative to a workpiece on movement of the head 16 of the machine 17.

After the workpiece has been eroded by the first electrode held in the desired position by the removable pin 198 extending through the disc 190 and the lever 194, the head 16 is retracted, the pin 198 is removed and the disc 190 is rotated to position the next desired electrode which is secured to the disc 190 into cutting position with respect to the workpiece. The pin 198 is then again extended through the disc 190 and lever 194 to lock the next electrode in cutting position and the head is again moved toward the workpiece in the usual manner to produce erosion of a workpiece. Thus a plurality of different electrodes may be used to erode a single workpiece without the necessity of exchanging tools carried by the head 16 by means of the indexable tool 44.

Figure 14:
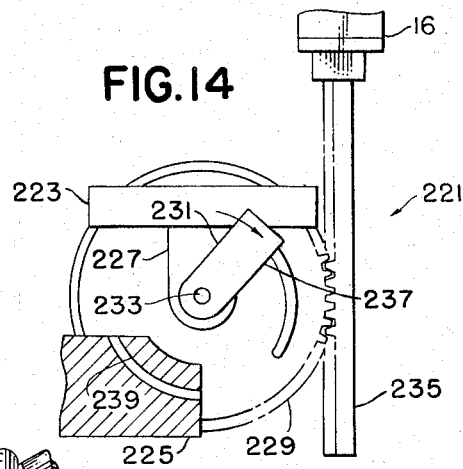
FIGURE 14 is a modification of the tool illustrated in FIGURE 13 wherein rack and gear actuating means are provided for the arcuate electrode.

The tool 46 illustrated in FIGURE 14 is similarly constructed for use with and exact positioning on the head 16 by means of the dovetail portion 202 of the base 204 having the locating recess 206 therein. Base 204 further includes the bracket 208 for supporting the servomotor 210. The lever 212 having the arcuate electrode 214 secured thereto is mounted on the motor shaft 216 for rotation therewith.

Thus in operation of the tool 46 the head 16 of the machine 17 illustrated in FIGURE 1 is brought to a predetermined position with respect to a workpiece 218 in which an arcuate passage 220 is to be cut. The servomotor 210 is then operated to feed the lever arm 212 in a counterclockwise direction whereby the electrode 214 is caused to trace an arcuate path through the workpiece 218 as the passage 220 is eroded therein in accordance with the usual electro-erosion machining principles.

The advantage of the tool 46 is obvious in that with such construction arcuate passages which heretofore have been difficult or impossible to cut in workpieces are easily produced thereby.

In the modified tool structure 221, the base 223 is supported in a fixed position above a workpiece 225. The bracket 227 depends from the base 223 and rotatably supports the gear 229 and lever 231 which are connected to the same shaft 233 for rotation therewith. Thus, in operation, as the head 16 is driven down by a servo motor associated therewith the rack 235 will rotate the gear 229 to move the arcuate electrode 237 into contact with the workpiece to machine the arcuate passage 239 therethrough.

The tool 48 illustrated in FIGURE 15 again is interchangeable with the other disclosed tools and is constructed for use with the machine 17 illustrated in FIGURE 1 and to be exactly located by means of the dovetail portion 222 of the base 224 having the locating recess 226 therein. The base 224 is provided with the brackets 228 and 230 supporting the opposite ends of the guide bars 232 along which the slide 234 is reciprocated. The bracket 236 supporting the motor 238 operable to drive the connecting links 240 and 242 to produce reciprocation of the slide 234 is also supported by the base 224. An electrode 244 is secured to the slide 234 for reciprocation therewith.

In operation the electrode 244 is used to cut slots 246 in a workpiece, such as the pipe 248, illustrated in FIGURE 15. Due to the reciprocal movement of the electrode 244 the entire electrode 244 is worn away evenly as it is fed downwardly with the tool 48 by the head 16. In addition with reciprocation of the electrode 244 an electrode shorter than the entire length of the slot 246 may be used to cut the slot 246. Without the reciprocation of the electrode 244 provided by the tool 48 an electrode as long as the slot 246 would necessarily have to be used to machine the slot 246 and the electrode would wear unevenly whereby the useful life thereof would be substantially shortened.

Figure 16:
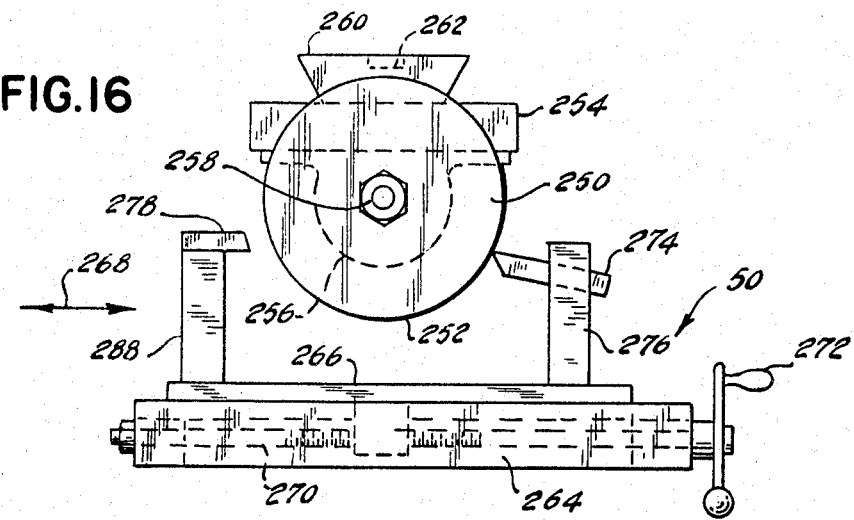
FIGURE 16 is a diagrammatic representation of a workpiece supporting tool for use with the machine illustrated in FIGURE 1 including structure for dressing an electrode supported by the machine head without removing the electrode from the machine or the workpiece from the tool.

The tool 50 illustrated in FIGURE 16 is provided in conjunction with a disc electrode 250 having a formed circumference 252 which is supported for rotation on base 254 on energization of a motor 256. The electrode 250 is secured to the output shaft 258 of motor 256. Base 254 may be mounted on head 16 by means of the dovetail portion 260 and locating recess 262 in an exact predetermined position.

Tool 50 includes a base 264 adapted to support a slide 266 within the reservoir 20 of machine 17 for movement in the direction of arrows 268 by means of the feed screw 270 operated by hand wheel 272. Thus with the tool to be sharpened 274 carried by bracket 276 on slide 266 positioned in contact with the electrode 250 below the center line thereof, as shown in FIGURE 16, the electrode 250 will be fed into the tool 274 on downward movement of the electrode 250 with the head 16 to sharpen the tool.

When it is desired to dress the electrode 250 the slide 266 is moved to the right in FIGURE 16 so that the circumference 252 of the electrode 250 engages the dressing tool 278 supported on the bracket 280 which is secured to the slide 266 for movement therewith. After the electrode 250 is dressed the tool 274 may be moved back into contact with the electrode by means of the feed screw 270 for continued sharpening of the tool 274.

Thus with the tool 50 illustrated in FIGURE 16 it is not necessary to remove the electrode 250 from the machine 17 or to remove the workpiece from the tool 50.

Tool 52 is provided for use in conjunction with the machine 17 for the electro-erosion of metal to produce passages in workpieces which are of greater axial extent than the allowed movement of the head 16 of the machine 17.

Figure 17:
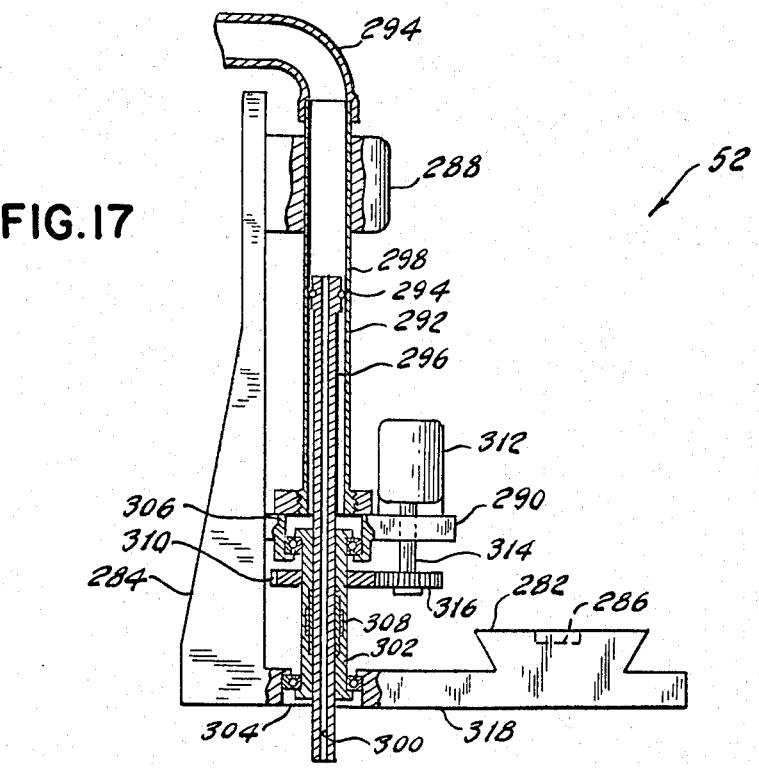
FIGURE 17 is a diagrammatic representation of a tool for use with the machine illustrated in FIGURE 1 whereby holes deeper than the head movement of the machine illustrated in FIGURE 1 may be produced.

Tool 52 is again supported from the head 20 and exactly located with respect thereto by means of the dovetail portion 282 of the frame 284 having the locating recess 286 therein. Frame 282 includes the brackets 288 and 290 secured thereto between which the tube 292 is secured. Dielectric fluid is connected to the tube 292 through a flexible hose 294 secured to the top thereof, as shown in FIGURE 17.

An electrode 296 having an enlarged end 298 and a passage 300 extending axially thereof is telescopically positioned in the tube 292. A seal 294 is positioned between the enlarged end 298 of the electrode 296 and the tube 292 so that the dielectric under pressure in hose 294 will produce a downward pressure on the enlarged end 298 of the electrode 296. The seal 294 restricts the dielectric fluid to a discharge path through the central passage 300 of the electrode.

Electrode 296 passes through a conduit 302 which is mounted for rotation in bearings 304 and 306. Conduit 302 is provided with a collet 308 for releasably securing the electrode 296 thereto for rotation therewith. In addition the conduit 302 is secured to the gear 310 for rotation therewith on rotation of the gear 310 by means of the motor 312 secured to the bracket 290, motor drive shaft 314 and gear 316 in mesh with the gear 310.

Thus in operation when it is desired to cut a passage through a workpiece which is of greater axial extent than the allowed vertical movement of the head 16, the tool 52 is secured to the head 16, the electrode 296 is telescoped into the tube 292 with the electrode extending a distance beyond the portion 318 of the base 284 approximately the same distance as the vertical movement of the head 16. The collet 208 is then tightened to secure the electrode 296 to the conduit 302 for rotation therewith and a machining operation is carried out with the machine 17 with the head being moved vertically in the normal manner and the electrode 296 being rotated by the motor 312.

When the end of the vertical movement of the head 16 is reached the head 16 is retracted, the collet 308 is loosened and the electrode 296 is moved downwardly in the passage previously cut to the bottom thereof. The collet is then retightened and the electro-erosion of the workpiece continued through the vertical adjustment distance of the head 16. This process is repeated until the complete passage has been eroded in the workpiece.

The axial length of opening which can be machined in this manner is limited as will be evident from the consideration of the structure only by the length of the tube 292 and the length of the electrode 296. Thus the tool 52 provides simple, efficient and economical means for electro-erosion of deep holes or passages in a workpiece.

Tool 53 is used in conjunction with machine 17 for the electro-erosion of metal and a helical electrode 322 to produce a helical passage in a workpiece. Tool 53 may be secured to the head 16 of the machine 17 by the dovetail portion 324 of the support 326 in the manner previously considered. The portion 54 of the tool 53 for producing a selected rotary motion of the helical electrode 322 and a predetermined simultaneously axial movement of the electrode is substantially the same as the milling and grinding machine disclosed by W. Umbdenstock Patent No. 2,375,052. It will not therefore be considered in detail. The tool 18 differs from the milling and grinding machine of Umbdenstock in that since no back pressure is present in electro-erosion machining friction engagement has been provided between the driving wheel 328 and slide 330 and between the slide 332 and the driven wheel 334 in place of the rack and pinion teeth of Umbdenstock. Additionally a servo motor 336 has been provided on the support 326 which is driven in accordance with the spacing of the spark gap as the head 16 of the machine 17 is normally driven while such drive is removed from the head 16 of the machine 17. Also in the tool 53 the servo motor 336 is mounted in a slide 338 and is connected to a piston and cylinder construction 340 by means of the piston rod 342.

Figure 18:
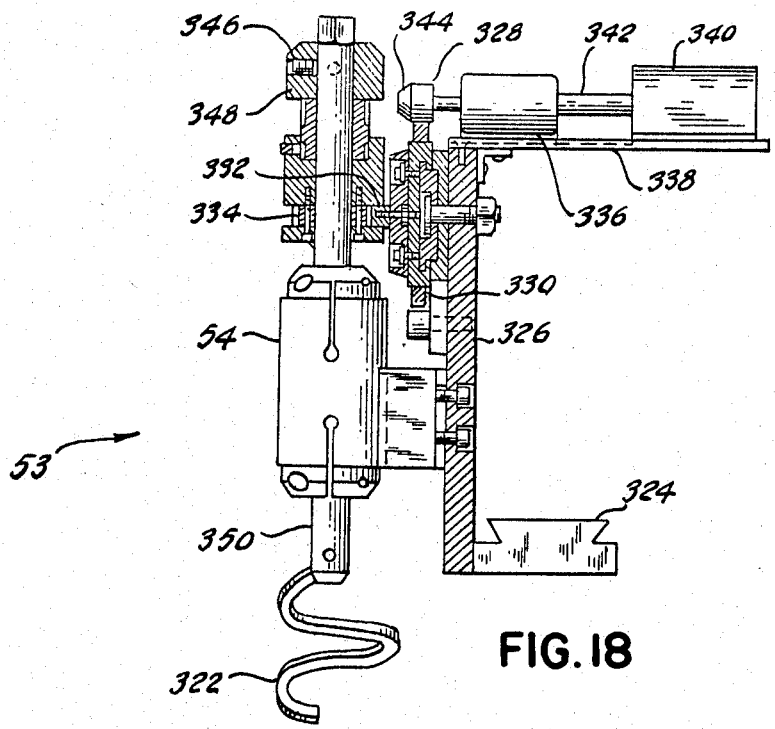
FIGURE 18 is a diagrammatic representation of a tool for use with the machine illustrated in FIGURE 1 whereby an electrode may selectively be simultaneously rotated and advanced toward a workpiece or only continuously rotated.

Thus at the end of the operation as described by Umbdenstock when the electrode has travelled the full distance axially allowed by slide 330 the piston 340 may be actuated by convenient means (not shown) to move the servo motor 336 to the left in FIGURE 18 whereby the bevelled end 344 of the wheel 328 is caused to engage the bevelled end 346 of the tool member 348 which is secured to the upper end of the shaft 350 for rotation therewith to produce continuous rotation of the shaft 350. This leftward movement of the driving wheel 328 disengages the wheel 328 from the slide 330. In addition the slide 332 is provided with a portion at the end thereof corresponding to the axially downward limiting position which will not frictionally engage the driven wheel 334 but which will hold the driven wheel 334 in a predetermined axial position. Continuous rotation of the shaft 350 is then accomplished directly by the servo motor 336 through the bevelled portion 344 of the drive wheel 328 and the frictionally engaged bevelled portion 346 of the tool member 348. When it is desired to retrace the helical path of the electrode 322 after continuous rotation of the shaft 350 through tool member 348 the piston and cylinder 340 are actuated to move the drive wheel 328 to the right in FIGURE 18 into engagement with slide 330. Again the proper electrical potentials are applied between the electrode 322 and a workpiece to produce electro-erosion machining of metallic members as considered above.

It will now be evident that there has been disclosed in accordance with the invention a machine for the electro-erosion of metals including improved structure for guiding the head 16 in vertical movement which permits rapid accurate adjustment and alignment of the head and minimizes the effect of wear between the head 16 and guide structure 30. Structure for quickly and efficiently exchanging tools carrying electrodes on the head 16 with the electrodes of the exchanged tools in exact predetermined positions and a plurality of tools for use with the machine 17 illustrated in FIGURE 1 to facilitate the spark erosion of a workpiece have similarly been disclosed.

A plurality of modifications and embodiments of the invention as disclosed are contemplated. It is the intention to include all modifications and embodiments of the invention as are encompassed by the appended claims within the scope of the invention.

What I claim as my invention is:

1. In apparatus for the electro-erosion of metals, means for exactly locating interchangeable tools, comprising a tool supporting head, a dovetail slot in the tool supporting head having one side movable toward the other side of the slot, means for moving the one side of the dovetail slot toward the other side thereof and a locating pin extending into one end of the dovetail slot.

2. Structure as set forth in claim 1, wherein the one side of the dovetail slot is separated from the rest of the tool supporting head and tongue and groove structure is provided between the rest of the head and the one side of the dovetail slot for guiding the one side of the dovetail slot in movement toward the other side thereof and the means for moving the one side of the dovetail slot toward the other side thereof comprises a bolt extending through the head toward the one side of the dovetail slot and threadedly engaged therewith.

3. Structure as set forth in claim 2, wherein the locating pin is cylindrical and extends axially into the dovetail slot perpendicularly thereto.

4. A machine for electro-erosion of metals including a frame, guide means supported by said frame, an electrode supporting head reciprocally movably mounted on the guide means, means operable between the guide means and head for rapid, accurate adjustment and alignment of the head and means provided integrally with said head for facilitating the rapid securing of one of a plurality of interchangeable electrode carrying tools to said head with the one of the tools in exact location on the head, comprising a dovetail slot in said head having one side movable toward the other side thereof, means for moving the one side of the dovetail slot toward the other side thereof, a locating pin extending into the dovetail slot at one end thereof and means for electrically insulating the head from the guide means.

5. Structure as set forth in claim 4, wherein the one side of the dovetail slot is separated from the rest of the tool supporting head and tongue and groove structure is provided between the rest of the head and the one side of the dovetail slot for guiding the one side of the dovetail slot in movement toward the other side thereof and the means for moving the one side of the dovetail slot toward the other side thereof comprises a bolt extending through the head toward the one side of the dovetail slot and threadedly engaged therewith.

6. Structure set forth in claim 4, wherein the locating pin is cylindrical and extends axially into the dovetail slot perpendicularly thereto.

References Cited

UNITED STATES PATENTS

| 932,215 | 8/1869 | McWilliams. | |
| 2,765,394 | 10/1956 | Griffith | 219—69 |
| 2,885,529 | 5/1959 | Nelson | 219—69 |
| 3,217,131 | 11/1965 | Brettrager | 219—69 |

FOREIGN PATENTS

| 244,525 | 4/1947 | Switzerland. |

RICHARD M. WOOD, *Primary Examiner.*

R. F. STAUBLY, *Assistant Examiner.*